Feb. 14, 1967     F. E. WIXSON     3,303,637

SAFETY LAWN MOWER BLADE

Filed May 14, 1964

INVENTOR.
FRANK E. WIXSON
BY Kimmel & Crowell
ATTORNEYS.

3,303,637
SAFETY LAWN MOWER BLADE
Frank E. Wixson, 1138 W. Juliah Ave.,
Flint, Mich. 48505
Filed May 14, 1964, Ser. No. 367,388
1 Claim. (Cl. 56—295)

This invention relates to a lawn mower blade for use in combination with a conventional rotary lawn mower and relates more particularly to a blade which is specifically designed for safety and efficiency in operation.

A primary object of this invention is the provision of a rotary lawn mower blade which is simple and inexpensive to manufacture, reliable, efficient and safe to use, and sturdy and durable in construction.

Another object of this invention is to provide a lawn mower blade of the type described which includes at least one radially extending blade member formed of a loop of a resilient wire material such as a spring steel material or the like whereby the blade member will readily cut grass in an efficient manner while bending or flexing on contact with a more rigid obstacle such as a rock or the like and also such as a portion of the operator's body, such as his foot or shoe.

Other and further objects reside in the combinations of elements, arrangements of parts, features of construction.

Still other objects will in part be obvious and in part be pointed out as the description of the invention proceeds and as shown in the accompanying drawing wherein.

Similar reference characters refer to similar parts throughout the several views of the drawing.

Figure 1:
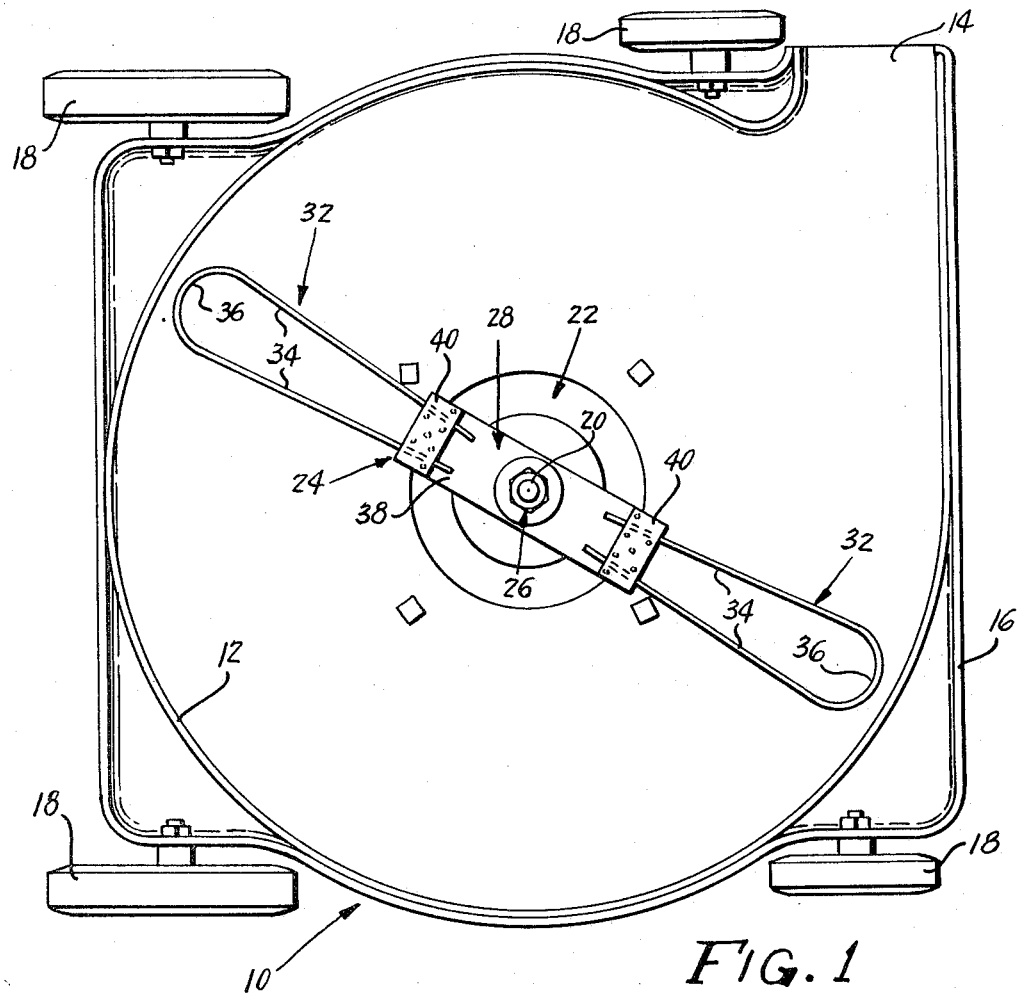
FIGURE 1 is a bottom plan view of a conventional rotary lawn mower having a mower blade in accordance with the instant invention operatively secured thereto.
Figure 2:
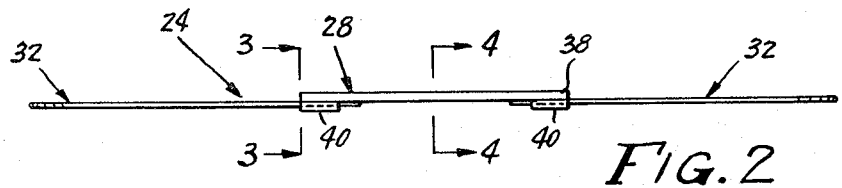
FIGURE 2 is a side elevational view of the mower blade of the instant invention.
Figure 3:
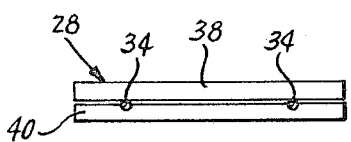
FIGURE 3 is a transverse cross-sectional view taken substantially on line 3—3 of FIGURE 2.
Figure 5:
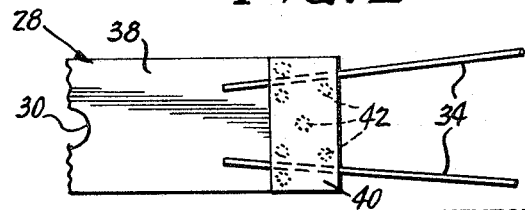
FIGURE 5 is an enlarged fragmentary bottom plan view of a portion of the mower blade particularly showing the means of connecting the blade member to the hub portion of the same.
Figure 4:
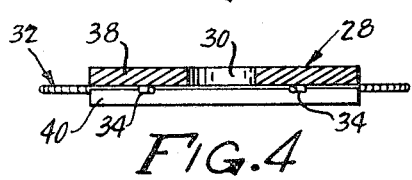
FIGURE 4 is a transverse cross-sectional view taken substantially on line 4—4 of FIGURE 2.

Referring now to the drawing in general, and more particularly to FIGURE 1, the underside of a conventional rotary lawn mower is designated by the reference numeral 10 and includes a housing 12 having an exhaust opening 14 and carried by a frame 16 having wheels 18 rotatably secured thereto. A driving shaft 20 has operatively secured thereto any conventional driving means 22 such as well known gas or electrical motor means.

A mower blade in accordance with the instant inventive concept is designated generally by the reference numeral 24 and is shown in FIGURE 1 as secured to the driving shaft 20 by a washer and nut means 26 for rotation with the driving shaft. The blade 24 includes a hub portion 28 shown for illustrative purposes as substantially rectangular and including an aperture 30 defined therein for receiving the driving shaft 20. At least one radially extending blade member 32 is secured to the hub portion 28 and is formed of a resilient wire material such as spring steel or the like. The preferred embodiment shown in the drawings includes two oppositely extending radial blade members 32 as this has been shown to provide most efficient grass cutting, but it is to be understood that any number of such blade members may be utilized without departing from the instant inventive concept. Each blade member 32 includes two leg portions 34 integrally secured at one end with a connecting portion 36 to form an elongated loop, the other ends of the leg portion 34 being secured to the hub portion 28 in any conventional manner. For example, and as shown in the drawing, the other ends of the leg portions 34 are interposed between a first plate member 38 defining the hub portion 28 and second plate members 40 welded or otherwise secured to the first plate member 38 as indicated at 42.

Although the second plate members 40 have been shown as welded to the first plate member 38, it will be readily understood that these members may be made removably secured such as by nuts and bolts, or the like in order that the blade members 32 may be replaced in the event of breakage.

It will also be understood that although the blade members 32 have been shown as formed of wire material having a substantially circular cross-section, that the use of other cross sections is within the instant inventive concept. For example, a flat cross-section having somewhat sharpened leading edge may be provided to facilitate grass cutting.

The use and operation of the device of the instant invention will now be apparent. When the driving shaft 20 is rotated by the driving means 22, the mower blade 24 revolves therewith whereby the blade members 32 will shear grass or the like extending upwardly into the housing 12 from a surface over which the mower 10 is operated. The open loop shape of the blade members 32 prevents cut grass from building up on the top surface thereof as is conventional with many blades used heretofore. The inherent resiliency in the wire material forming the blade members 32 provides a whipping action which increases the cutting efficiency, while simultaneously permitting the blade member to bend or flex in the event that it contacts a somewhat rigid member such as a rock or the foot or shoe of the operator. This increases the life of the blade by preventing breakage of the same and substantially eliminates accidents causing injury to the operator thereby improving the safety of the device.

It will now be seen that there is herein provided an improved mower blade for a rotary lawn mower which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

In combination, a rotary lawn mower including a substantially vertical driving shaft, means operatively secured to said shaft for rotating the same, and a mower blade secured to said shaft for rotation in a horizontal plane therewith, said mower blade including a pair of radially extending cutter members formed of spring steel material of circular cross section, said mower blade including a hub portion secured to said shaft; each of said cutter members extending radially outward from the hub portion and including a pair of radially opposed elongated loops of said spring wire material, said loops each having two substantially straight leg portions, each leg portion having one end secured to said hub portion and a substantially U-shaped connecting portion integrally formed between the other ends of said leg portions, said hub portion including a first substantially rectangular elongated plate member having a central portion defining an aperture for receiving said shaft, and a pair of substantially rectangular second plate members, fixed to the ends of said first plate member with the ends of the leg portions of each of said loops interposed between said first plate member and one of said second plate members in clamped relation.

References Cited by the Examiner
UNITED STATES PATENTS

| | | | |
|---|---|---|---|
| 2,663,137 | 12/1953 | Asbury | 56—295 |
| 2,755,829 | 7/1956 | Streed et al. | 56—29 X |
| 3,018,602 | 1/1962 | Diesterweg | 56—295 |
| 3,068,633 | 12/1962 | Taylor | 56—295 |
| 3,208,209 | 9/1965 | Dunlap et al. | 56—295 |

FOREIGN PATENTS 685,133 4/1964 Canada.

ABRAHAM G. STONE, *Primary Examiner.*

ANTONIO F. GUIDA, *Examiner.*